United States Patent [19]

Winn

[11] 4,396,241

[45] Aug. 2, 1983

[54] FRAME FOR FURNITURE, IN PARTICULAR FOR DISPLAY CABINETS AND SHOWCASES

[75] Inventor: Klaus Winn, Giessen, Fed. Rep. of Germany

[73] Assignee: Weyel KG Visuelle Einrichtungen, Haiger, Fed. Rep. of Germany

[21] Appl. No.: 229,236

[22] Filed: Jan. 28, 1981

[30] Foreign Application Priority Data

Jan. 31, 1980 [DE] Fed. Rep. of Germany ... 8002384[U]

[51] Int. Cl.³ ...................... F16B 12/00; A47B 47/00
[52] U.S. Cl. ......................... 312/257 R; 312/257 SK; 312/140; 312/111; 403/295; 403/205
[58] Field of Search ............. 312/140, 257 R, 257 SK, 312/257 SM, 257 A, 111; 403/403, 205, 295

[56] References Cited

U.S. PATENT DOCUMENTS

| | | | |
|---|---|---|---|
| 3,044,656 | 7/1962 | Combs et al. | 312/257 SK |
| 3,353,863 | 11/1967 | Koot | 312/257 R |
| 3,370,521 | 2/1968 | Honerkamp | 312/257 R |
| 3,494,686 | 2/1970 | Diack | 312/257 R |
| 3,892,189 | 7/1975 | Killam | 312/257 SK |
| 3,945,743 | 3/1976 | Koch | 312/257 SK |
| 4,281,883 | 8/1981 | Zacky | 312/257 R |

FOREIGN PATENT DOCUMENTS

| | | | |
|---|---|---|---|
| 724537 | 12/1965 | Canada | 403/295 |
| 2461474 | 8/1975 | Fed. Rep. of Germany | 403/295 |
| 1464373 | 2/1977 | United Kingdom | 312/140 |

*Primary Examiner*—Victor N. Sakran
*Attorney, Agent, or Firm*—Flynn, Thiel, Boutell & Tanis

[57] ABSTRACT

A frame for furniture, particularly for display cabinets and showcases, having profiles which form the frame walls and having corner pieces to which the profiles are connected at profile-corner piece connections. At least one profile abuts bluntly on an associated end surface of a corner piece and is pulled thereagainst by at least one screw on the associated end surface. Such screw has its head resting on the corner piece and is screwed into the butting profile. The corner pieces are of hollow construction and have on at least one end thereof an end wall which the screw grips. The corner pieces have, near the screw, a lateral opening through which the screw is accessible in a direction transverse to the longitudinal axis of the screw.

15 Claims, 6 Drawing Figures

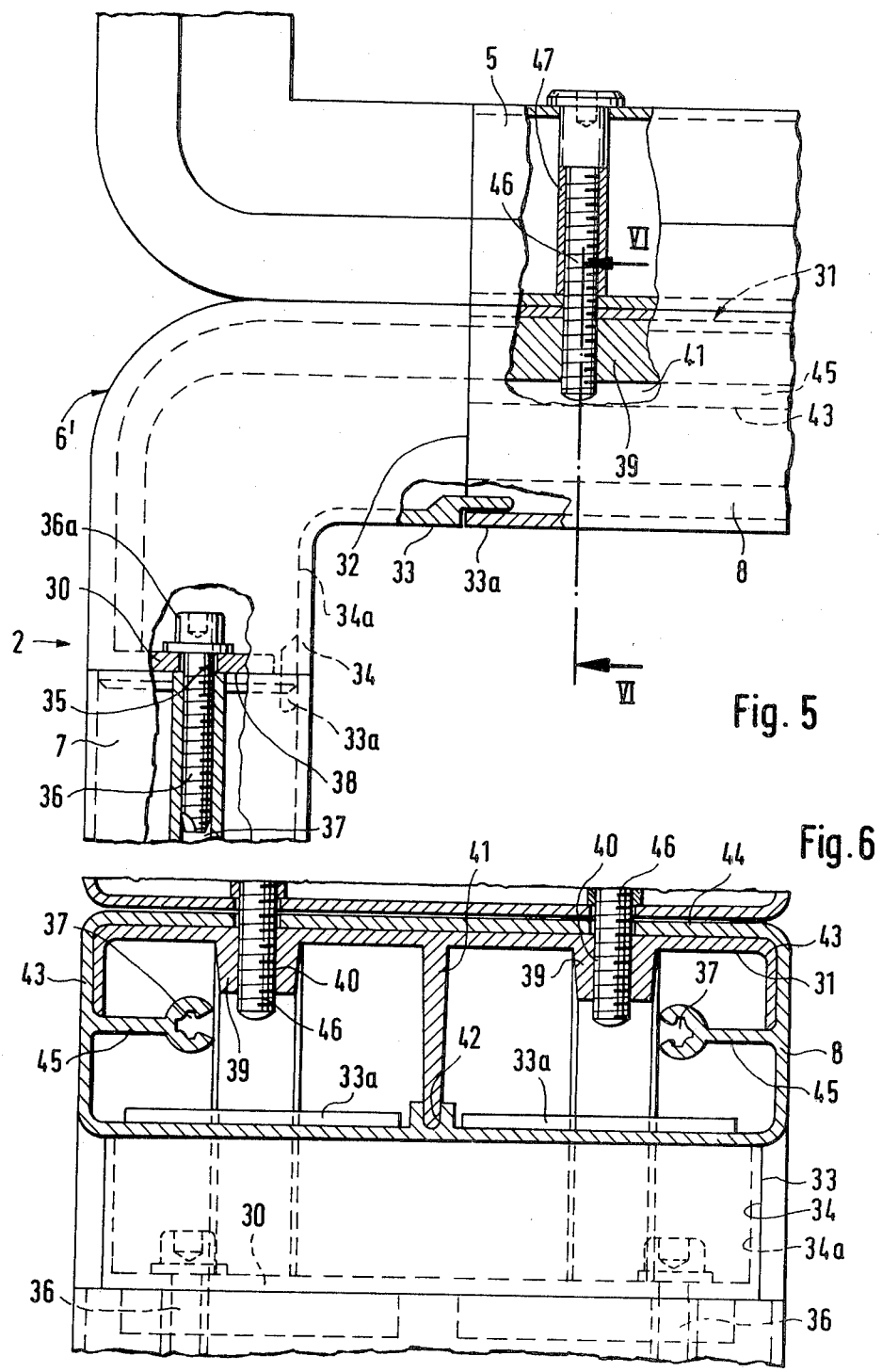

FRAME FOR FURNITURE, IN PARTICULAR FOR DISPLAY CABINETS AND SHOWCASES

FIELD OF THE INVENTION

The invention relates to a frame for furniture, in particular for display cabinets and showcases, with profiles which form the frame wall and with corner pieces, to which the profiles are connected, whereby at least one profile butts bluntly on the associated end surface of the corner piece and is pulled to the associated end surface by means of at least one screw, which screw rests with its head on the corner piece and is screwed into the butting profile.

BACKGROUND OF THE INVENTION

In conventional frames of this type a bore is provided in the corner pieces, which bore extends in direction of the screw axis and exits at the peripheral surface which is visible on the finished frame. This interruption of the visible peripheral surface is undesired for aesthetic reasons. Also the bore forms an opening, through which moisture can penetrate into the frame construction which is particularly disadvantageous when used outside. The bore also forms a place for dust and other contaminations to accumulate and can be kept clean only with great difficulty.

The basic purpose of the invention is to construct, in a frame of the above-mentioned type, the connection of the corner piece with an adjacent profile, so that holes for introducing connecting screws are avoided on the visible peripheral surfaces.

This purpose is attained according to the invention by the corner pieces being of hollow construction and having, on at least one end, an end wall through which the screw extends, and by providing a lateral opening in the corner piece adjacent the area of the screw, through which opening the screw is accessible in a direction transverse of its longitudinal direction.

The opening, through which the screw is accessible, can be arranged in the inventive frame always in such a manner as to avoid interfering with the appearance of the visible surfaces. For example, the opening can be arranged on the backside of a frame, which will later be covered up by a backwall. This avoids exposed screw holes into which moisture and dirt can penetrate and which are disadvantageous as to the looks of the frame.

Corner pieces are possible in which on both ends end walls are provided through which screws extend, and other corner pieces are possible which have an insert part at one end. The opening for the access to the screws can extend over the entire length of the corner piece. However, constructions are also possible in which only relatively short access openings, or windows, are provided.

It is particularly advantageous to construct the screw openings in the corner piece end walls as slots. In such a construction it is possible to make the lateral access openings shorter than the screws, since the screws can first be partly screwed into the profiles and then the corner pieces can be laterally pushed onto the profiles.

It is particularly advantageous to provide a corner piece whose cross section has a perimeter shaped approximately like a flattened rectangle, wherein the lateral access opening is located in a short side of such rectangle, such corner piece shape being particularly suited for frames which consist of relatively wide and flat profiles. Since the wide sides of the corner pieces from visible sides of the frame, it is advantageous to provide the lateral opening on the narrow side of the corner piece.

If at the profile-corner piece connection at one corner piece end there is provided only one screw located at a connection point near the lateral access opening for pulling close together the associated profile and corner piece, then it is advantageous to provide an additional connecting point, on the side of the corner piece end opposite to the first mentioned connecting point, wherein at the additional connecting point a further screw engages a flap formed on the corner piece, which further screw extends through the wall of the connected profile and wherein the axis of the further screw extends transversely to the longitudinal direction of the connected profile. This avoids with certainty the formation of a gap between the corner piece and connected profile.

The lateral access opening can be closed with a special lid. The closing can, however, also occur by covering the opening with a backwall or by arranging a further corner piece next to the first-mentioned corner piece. In some cases the lateral access opening may also remain unclosed.

Corner pieces with insert parts are connected by means of screws which are arranged transverse to the longitudinal direction of the profiles. This avoids uncovered screw holes. This connection is also used for a connection of two frames to one another. With this it is for example possible to connect a frameshaped base of a display cabinet with the frame of the display cabinet. Sufficiently long threaded holes are obtained for the screws which extend transverse to the longitudinal direction of the profiles, if one forms special bars within the corner pieces. Through this also, particularly for relatively soft material, tearing out of the thread is avoided. An insert part can be further reinforced by a center rib.

Particularly advantageous are hexagonal-recess screws. Such screws are particularly suited for tightening, if tool engagement in the axial direction of the screws is not possible, since keys for hexagonalrecess screws normally are constructed as bent hexagonal rods.

The corner pieces are advantageously designed as die-cast parts of aluminum. However, the invention is not limited to the use of this material. All suitable materials, thus in particular also plastic, can be utilized.

BRIEF DESCRIPTION OF THE DRAWINGS

Exemplary embodiments of the invention are illustrated in the drawings, in which:

FIG. 5 illustrates a portion from FIG. 1 in the area of the dash-dotted circle V of FIG. 1 in the same scale used in FIGS. 2 to 4; and FIG. 6 is a cross-sectional view along the line VI—VI of FIG. 5.

DETAILED DESCRIPTION

Figure 1:
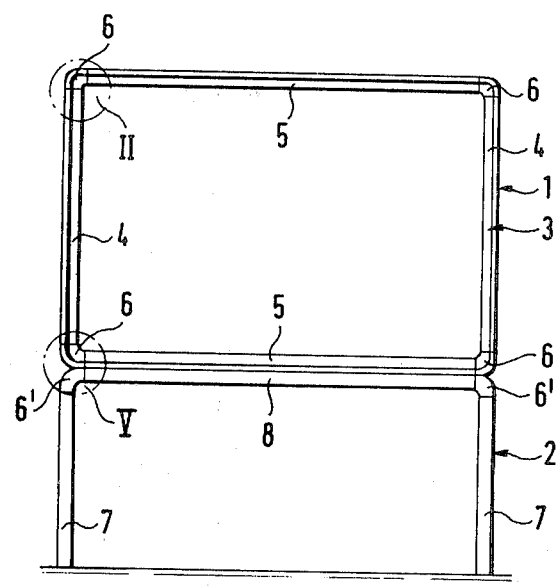
FIG. 1 illustrates in a much reduced scale the front view of a display cabinet, which sits on a partially illustrated base.

FIG. 1 illustrates a display cabinet 1 which is positioned on a base 2. The display cabinet has a frame which is identified as a whole by reference numeral 3 and which has short sidewalls 4 and long sidewalls 5. These walls are formed by profiles, which are connected by means of corner pieces 6.

The base 2 consists of a framelike frame of which, however, the lower wall is not illustrated. Said frame comprises short profiles 7 and long profiles 8, which are connected by means of corner pieces 6'. Parallel to the frame side 8 there extends a not-illustrated equal frame side, which is also connected to the vertical walls 7 through corner pieces 6' and on which feet are provided. First, referring to FIGS. 2 to 4, the corner connection on the display cabinet 1 is discussed hereinafter.

Figure 4:
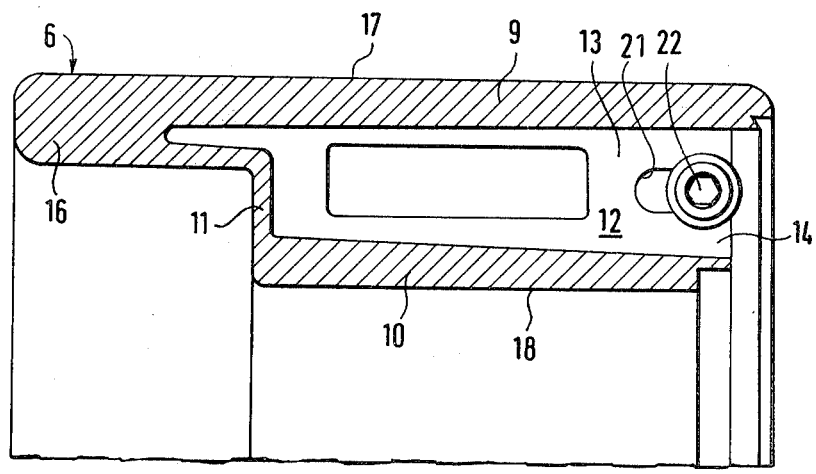
FIG. 4 is a horizontal cross-sectional view taken on the line IV—IV of FIG. 3.

The corner pieces 6 are shaped parts, preferably diecast parts made of aluminum. The cross section can be seen from FIG. 4. FIG. 4 illustrates that the corner piece 6 is of hollow construction, and has a cavity 13 defined by an outer wall 9, an inner wall 10, a front wall 11 and end walls 12 and 15. The cavity 13 has an opening 14 which is opposite the narrow wall 11, which opening extends from one end wall 12 to the other end wall 15.

From the wall 11 extends a wall 16, which can be considered to be an extension of the wall 9. The walls 9 and 16 have a flat outer surface 17, which forms a part of the peripheral surface of the frame. The inner wall 10 has an also flat outer surface 18. The walls 16 and 11 form a groove for receiving a door or a thick glass wall.

Short pegs 19 are formed on the end walls 12, which (see FIG. 3) fit into a cavity 20 of the profiles 5 and 4. The outer circumference of the cross sections of the corner pieces and of the connected profile is the same, so that these blend into one another without a step at least along the visible surfaces thereof.

Slots 21 are provided at the end walls 12, which have an access opening 21' at the edge of the end walls. A fastening screw 22, which is screwed into the connected profile, namely into an existing threaded channel 23 therein, engages through said slot 21. The screws 22 each have a cylindrical head 22a with a hexagonal recess 22b.

Figure 3:
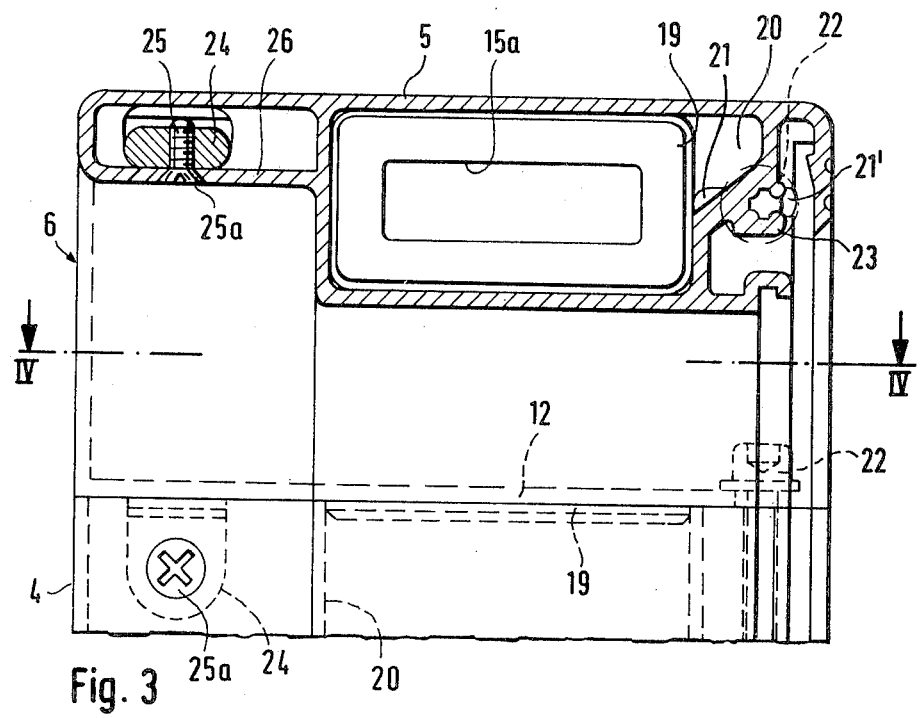
FIG. 3 is a cross-sectional front view taken on the line III—III of FIG. 2.

As one can see from FIGS. 3 and 4, the screws 22 are arranged near the edge of the corner piece 6. For an additional connection a flap 24 is formed on each end of the corner piece opposite said screws 22, which flap 24 also engages the connected profile. A screw 25 is screwed into said flap 24, which screw 25 has a countersunk head 25a, which is countersunk into the profile wall 26.

During the installation of a frame 1 screws 22 can first be screwed partially into the associated threaded channels 23. The corner piece 6 can thereafter be mounted by laterally pushing same onto the associated profile, whereby the partially screwed-in screw 22 is embraced by the slot 21. After the peg 19 is positioned correctly in the profile, the connection is fixed by tightening the screw 22 and by inserting the screw 25. However, it is also possible to first mount the corner piece 6 onto the connected profiles and to only then screw in the screws 22. Since the opening 14 extends over the entire arc length of the corner piece 6, it is also possible to introduce at a later time relatively long screws 22 from the side. The tightening of the screw 22 is easily possible by means of a bent hexagonal rod, which is inserted into hexagonal recess 22b.

Figure 2:
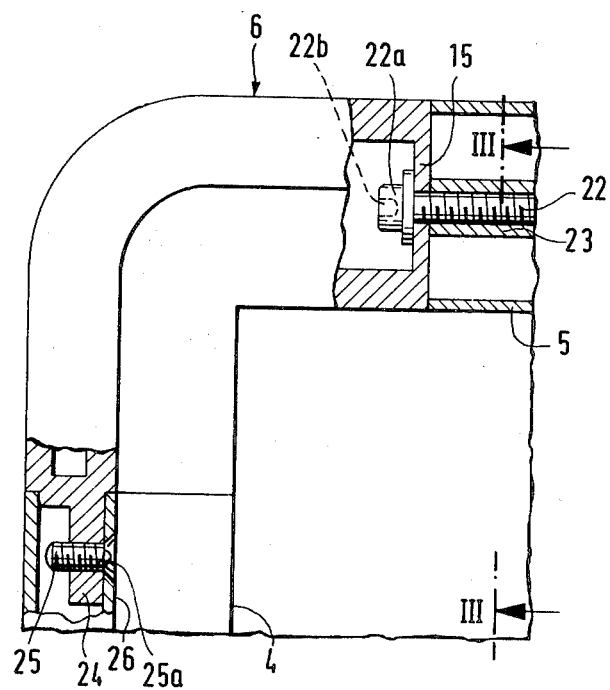
FIG. 2 illustrates a portion of FIG. 1 in the area of the dash-dotted circle II in a scale which is much enlarged compared with FIG. 1, namely in a natural size, and wherein some areas are illustrated in cross section.

For clarification it is remarked that the two cut surfaces in FIG. 2 lie in different planes, namely the cut surface appearing on the right in the upper part lies in a plane located on the right seen in FIG. 3 and passing through the screw 22 and the cut surface which appears on the left on the bottom in FIG. 2 lies in a plane located on the left in FIG. 3 and passing through the screw 25. Furthermore it is remarked that the end walls 12 and 15 have each openings. For example, the opening in the end wall 15 is identified by reference numeral 15a.

The corner pieces 6' (FIG. 5) of the base 2 have only at one end an end wall 30. At the other end of the corner piece there is arranged an insert part identified as a whole by reference numeral 31 and the cross section of which appears in FIG. 6. The insert part 31 fits inside of the profile 8 and, at the contact point 32 between profile 8 and corner piece 6', steps outward into the visible outer surface of the corner piece 6'. Also the corner piece 6' has a lateral opening 34, here on a wide side thereof, namely on the inside thereof. The opening 34 is closed off by a lid 33. The lid 33 has two flaps 33a at each end, which engage the inside of the connected profile. In FIG. 5, the lower left pair of flaps 33a extends downward snugly between the edge of end wall 30 and the inside wall of the profile 7. The corner piece 6' may be provided with suitable means, such as outward facing recessed shoulders indicated in dotted lines at 34a (FIGS. 5 and 6), against which the lid 33 may rest to limit entry of the lid into the interior cavity of the corner piece.

Two through holes 35 for screws are provided on the end wall 30, which screws are screwed into threaded channels 37, which are provided in the connected profile. Again a short peg 38, which fits into the connected profile, is provided on the end wall 30.

Two wide bars 39 are formed on the insert part 31, which bars on the one hand bring about an important stiffening of the insert part and on the other hand serve as a material accumulation for achieving sufficient depth of threaded holes 40 (FIG. 6). A center rib 41 is formed on the insert part between the bars 39, which center rib engages in a groove 42 inside the connected profile 8. Parallel to the center rib 41 extend outer walls 43 which, however, are substantially narrower than the center rib 41. The outer walls 43 are of such a height that they fit into the inside space between the profile wall 44 and the profile walls 45. The above-mentioned threaded channels 37 are provided at the ends of the profile walls 45.

As one can recognize from FIG. 5, the corner pieces 6' are suited for the connection of the frame 1 to the base 2, which itself is constructed like a frame. Two screws 46 are used for the connection, which screws 46 are placed transversely through the lower profile 5 of the frame 1 and are screwed into the threaded holes 40. To avoid squashing the profile 5 during a strong tightening of the screws 46, a sleeve 47 is provided, which resists the compression forces produced by the screw.

During the assembling of the base 2, the opening 34 in the corner piece 6' at first is left open, so that the screwheads 36a of the screws 36 are accessible from the side. After tightening of the screws 36 to fix the corner piece 6' to the end of the profile 7, the lid 33 is installed to close the opening 34, and the lid 33 and the insert part 31 are inserted into the profile 8. In the same manner, the lower profile (not shown in the drawings) which is parallel to the profile 8, is also connected to the lower corner pieces 6' (also not shown in the drawings).

Disclosures of showcase constructions which relate generally to the subject matter of this application may be found in two applications assigned to the same assignee as the present application, filed concurrently herewith, and respectively entitled, "CONSTRUCTION SET FOR THE MANUFACTURE OF FRAMES FOR FURNITURE" (Ser. No. 229,387) and "CONSTRUCTION SET FOR THE MANUFACTURE OF WINDOWS, PARTICULARLY WINDOWS FOR SHOWCASES" (Ser. No. 229,388).

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a frame for furniture, display cabinets and showcases having plural profiles which form frame walls and at least one corner piece to which said profiles are connected, wherein at least one profile abuts end-to-end with an associated end surface of said corner piece and is pulled thereagainst by means of at least one screw on said associated end surface, said screw having an enlarged head which rests on said corner piece and is screwed into the abutting profile, comprising the improvement wherein said corner piece is of a hollow construction and has on at least one end thereof an end wall, said end wall having means defining a hole therethrough, said screw being received in said hole with the enlarged head thereof resting on the inside surface of said end wall, said corner piece having a lateral opening in a sidewall thereof adjacent said enlarged head of said screw and through which said enlarged head is accessible in a direction transverse of the longitudinal axis of said screw, whereby a rotating of said screw about said longitudinal axis thereof will effect a pulling of said end surface of said profile against the outer surface of said end wall.

2. A frame according to claim 1, wherein said corner piece has at the opposite end thereof a further end wall with means defining a further hole therethrough receiving a further screw therethrough, the space between said end walls defining a cavity.

3. A frame according to claim 2, wherein said lateral opening in said corner piece extends over the entire extent of said cavity in said hollow corner piece from end wall to end wall.

4. A frame according to claim 1, wherein said hole in said end wall for said screw is a slot having an inlet opening which is accessible from the laterally outer side of said corner piece through said lateral opening.

5. A frame according to claim 1, wherein the cross section of said corner piece is generally rectangular shaped, and wherein said lateral opening is located in a short side of said rectangle.

6. A frame according to claim 1, wherein near the end of said corner piece remote from said end wall there is a flap formed on said corner piece, said flap extending into a mutually adjacent hollow profile upon abutment of said mutually adjacent end surfaces thereof, and wherein a further screw is provided extending through an opening in said profile and said flap, the axis of which further screw extends transversely to the longitudinal direction of said adjacent profile.

7. A frame according to claim 1, wherein said lateral opening is closed off by a lid, said lid having holding flaps which engage cavities of the adjacent profiles.

8. A frame according to claim 1, wherein the end of said corner piece remote from said end wall is constructed as an insert part insertable into a further hollow and adjacent profile, said insert part having further means defining a further hole therein for receiving a further screw therein, said further screw extending through a wall of said further profile transversely to the longitudinal direction of said further profile.

9. A frame according to claim 8, wherein said further screw screwed into said insert part also extends through a still further profile of an adjacent frame mounted on the first-mentioned frame such that the said screw serves to connect both frames together.

10. A frame according to claim 8, including bars formed on said insert part to create a sufficient length of thread where said further screws are screwed into said insert part, wherein said bars extend over the entire arc length of said corner piece and serve as reinforcing ribs.

11. A frame according to claim 8, wherein said insert part has a center rib, which extends the entire height of said adjacent profile and engages with its edge area a groove in a cavity in said adjacent profile.

12. A frame according to claim 1, wherein said screw extends parallel to said profiles and said enlarged head has a hexagonal recess therein.

13. A frame according to claim 1, wherein said corner piece is a die-cast part.

14. A frame according to claim 13, wherein said die-cast part is aluminum.

15. A frame according to claim 1, including pegs formed on said end wall of said corner piece and fitting into the hollow interior of said profile.

* * * * *